(12) United States Patent
Bitto et al.

(10) Patent No.: US 12,723,905 B2
(45) Date of Patent: Sep. 1, 2026

(54) CORIOLIS MASS FLOW METER

(71) Applicant: Endress+Hauser Flowtec AG, Reinach (CH)

(72) Inventors: Ennio Bitto, Aesch (CH); Hao Zhu, Freising (DE); Dirk Butzbach, Huningue (FR)

(73) Assignee: Endress+Hauser Flowtec AG, Reinach (CH)

( * ) Notice: Subject to any disclaimer, the term of this patent is extended or adjusted under 35 U.S.C. 154(b) by 242 days.

(21) Appl. No.: 18/701,083

(22) PCT Filed: Sep. 22, 2022

(86) PCT No.: PCT/EP2022/076351
§ 371 (c)(1),
(2) Date: Apr. 12, 2024

(87) PCT Pub. No.: WO2023/061719
PCT Pub. Date: Apr. 20, 2023

(65) Prior Publication Data
US 2024/0344868 A1 Oct. 17, 2024

(30) Foreign Application Priority Data
Oct. 14, 2021 (DE) ..................... 10 2021 126 715.3

(51) Int. Cl.
*G01F 1/84* (2006.01)

(52) U.S. Cl.
CPC .......... *G01F 1/8418* (2013.01); *G01F 1/8477* (2013.01)

(58) Field of Classification Search
CPC ..... G01F 1/8418; G01F 1/8477; G01F 1/8413
See application file for complete search history.

(56) References Cited

U.S. PATENT DOCUMENTS 5,731,527 A * 3/1998 Van Cleve ............ G01F 1/8477 138/DIG. 2
10,845,227 B2 * 11/2020 Zhu ....................... G01F 1/8409
2011/0113896 A1 * 5/2011 Drahm .................... G01F 15/00 73/861.357

(Continued)

FOREIGN PATENT DOCUMENTS

CN 110268231 A 9/2019
DE 102010043707 A1 5/2012
DE 102015118347 A1 4/2017

(Continued)

*Primary Examiner* — Francis C Gray
(74) *Attorney, Agent, or Firm* — Christopher R. Powers; Endress+Hauser (USA) Holding, Inc.

(57) ABSTRACT

A Coriolis mass flow meter includes: a measuring tube for guiding a medium; a support body connected to the measuring tube on the inlet side and on the outlet side; an exciter for exciting bending vibrations of the measuring tube; at least two vibration sensors for detecting vibrations of the measuring tube; and a reinforcing body fastened to a lateral surface of the measuring tube and surrounds the measuring tube, the reinforcing body including, at least in sections, a helical course with a plurality of windings, a distance between two adjacent windings of the reinforcing body being not less than twice, for example, not less than four times or not less than eight times, a material thickness of the reinforcing body in the region of the windings.

22 Claims, 1 Drawing Sheet

(56) References Cited

U.S. PATENT DOCUMENTS

2024/0027250 A1* 1/2024 Bitto .................... G01F 1/8409

FOREIGN PATENT DOCUMENTS

| | | | |
|---|---|---|---|
| DE | 102019114330 | A1 | 12/2020 |
| EP | 1427998 | A1 | 6/2004 |
| WO | 2016202537 | A1 | 12/2016 |
| WO | 2018130919 | A1 | 7/2018 |

* cited by examiner

CORIOLIS MASS FLOW METER

CROSS-REFERENCE TO RELATED APPLICATIONS

The present application is related to and claims the priority benefit of German Patent Application No. 10 2021 126 715.3, filed Oct. 14, 2021, and International Patent Application No. PCT/EP2022/076351, filed Sep. 22, 2022, the entire contents of which are incorporated herein by reference.

TECHNICAL FIELD

The present invention relates to a Coriolis mass flow meter.

BACKGROUND

Generic Coriolis mass flow meters are disclosed, for example, in EP 1 427 998 B1 and WO 2016/202537 A1. Conventional Coriolis mass flow meters comprise at least one first oscillatory measuring tube for guiding a medium; at least one support body, the at least one first measuring tube being connected to the support body on the inlet side and on the outlet side; at least one exciter for exciting at least one bending vibration mode of the at least one first measuring tube; at least two vibration sensors for detecting vibrations of the at least one first measuring tube; and at least one first reinforcing body which is fastened to a lateral surface of the at least one first measuring tube in order to reduce cross-sensitivity of the calibration factor calf for measuring the mass flow rate to the media pressure. The reinforcing bodies of the devices according to the prior art are designed as rings which are to be precisely positioned as individual parts on the measuring tubes and fastened thereto. Although this fulfills the intended purpose, it is relatively expensive and prone to errors during assembly. The object of the present invention is, therefore, to find a remedy.

SUMMARY

The object is achieved by the Coriolis mass flow meter according to the present disclosure.

The Coriolis mass flow meter according to the invention comprises: at least one first oscillatory measuring tube for guiding a medium; at least one support body, the at least one first measuring tube being connected to the support body on the inlet side and on the outlet side; at least one exciter for exciting at least one bending vibration mode of the at least one first measuring tube; at least two vibration sensors for detecting vibrations of the at least one first measuring tube; and at least one first reinforcing body which is fastened to a lateral surface of the at least one first measuring tube and surrounds the at least one first measuring tube, the at least one first reinforcing body having, at least in sections, a helical course with a plurality of windings, the distance between two adjacent windings of the reinforcing body being not less than twice, for example, not less than four times, and in particular not less than eight times the material thickness of the reinforcing body in the region of the windings.

In a further development of the invention, the material thickness of the at least one first reinforcing body is not less than half, for example, not less than three quarters of a wall thickness of the at least one first measuring tube.

In a further development of the invention, the at least one first measuring tube has a first material, the at least one first reinforcing body having a second material, and the thermal expansion coefficient of the first material not deviating from the thermal expansion coefficient of the second material by more than 2 ppm/K, for example, not by more than 1 ppm/K and in particular not by more than 0.5 ppm/K.

In a further development of the invention, the first material and the second material are metallic.

In a further development of the invention, the at least one reinforcing body is connected to the at least one measuring tube by means of at least one joint, which in particular comprises a hard solder connection.

In a further development of the invention, the hard solder connection comprises a nickel-based solder, in particular a solder of type AMS 4777, BNi-2.

In a further development of the invention, the at least one joint extends over at least one, for example, at least two and in particular at least three windings of the at least one reinforcing body around the at least one measuring tube.

In a further development of the invention, the at least one reinforcing body has at least one section which comprises at least three, for example, at least six and in particular at least eight continuous windings.

In a further development of the invention, the at least one measuring tube has a mirror-symmetrical course with respect to a measuring tube transverse plane, the at least one measuring tube having at least one section that is bent in the rest position of the measuring tube between the measuring tube transverse plane and an end of the measuring tube on the inlet side, in which section the direction of a measuring tube center line of the at least one measuring tube changes by an angle $\delta$ that is not smaller than 30°, the at least one reinforcing body in the bent section having no fewer than a windings, where: $a \geq \delta/20°$, for example, $a \geq \delta/15°$, and in particular $a \geq \delta/10°$.

In a further development of the invention, the measuring tube has a mirror-symmetrical course with respect to a measuring tube transverse plane, the measuring tube having at least one section that is bent in the rest position of the measuring tube between the measuring tube transverse plane and an end of the measuring tube on the inlet side, in which section the direction of a measuring tube center line changes by an angle $\delta$ that is not smaller than 30°, the measuring tube having an inner diameter d, the measuring tube center line in the bent section having an effective radius of curvature $r_K$, a ratio $V=4 \cdot d/r_K$ being given, the at least one reinforcing body in the bent section having no fewer than b windings, where: $b \geq \delta \cdot V/20°$, for example, $b \geq \delta \cdot V/15°$, and in particular $b \geq \delta \cdot V/10°$.

In a further development of the invention, the reinforcing body has a first section with windings which surround the measuring tube, the reinforcing body having a second section with windings which surround the measuring tube, a connection section running between the first section and the second section, the length of the connection section being not more than twice the distance of the first section from the second section in the direction of the measuring tube center line.

In a further development of the invention, a calibration factor calf can be determined for the meter, which calibration factor describes a proportional relationship between a mass flow rate dm/dt to be measured and a phase difference or time difference between signals of the vibration sensors, where the calibration factor calf has a relative cross-sensitivity $\Delta calf(\Delta p)$ to the difference $\Delta p$ between the pressure in the measuring tube and the pressure in the region surrounding the measuring tube, which is given as $$\Delta calf(\Delta p) := (\text{calf}(p) - \text{calf}(p0))/\text{calf}(p0)$$

where the absolute value of relative cross-sensitivity $|\Delta \text{calf}(\Delta p)|$ at a temperature equilibrium between the medium, the measuring tube and the region surrounding the meter at a temperature of 300 K applies in a linear approximation:

$$|\Delta calf(\Delta p)| < S \cdot d_i/t \cdot \Delta p,$$

where $d_i$ is the inner diameter of the at least one measuring tube, t describes the wall thickness of the at least one measuring tube and S is an upper proportionality limit for which the following applies: S<6 ppm/bar, for example, S<5 ppm/bar and in particular S<4 ppm/bar.

In a further development of the invention, a calibration factor calf can be determined for the meter, which calibration factor describes a proportional relationship between a mass flow rate dm/dt to be measured and a phase relationship or time difference between signals of the vibration sensor on the inlet side and the vibration sensor on the outlet side, where the calibration factor calf has a relative cross-sensitivity $\Delta \text{calf}(\Delta p)$ to the difference $\Delta p$ between the pressure in the measuring tube and the pressure in the region surrounding the measuring tube, which is given as $$\Delta calf(\Delta p) := (\text{calf}(p) - \text{calf}(p0))/\text{calf}(p0)$$

where the absolute value of relative cross-sensitivity $|\Delta \text{calf}(\Delta p)|$ at a temperature equilibrium between the medium, the measuring tube and the region surrounding the meter at a temperature of 300 K applies in a linear approximation:

$$|\Delta calf(\Delta p)| = K \cdot \Delta p,$$

where K is a device-specific constant, where the following applies to the absolute value of the relative cross-sensitivity of a reference meter in a linear approximation:

$$\left|\Delta calf_{ref}(\Delta p)\right| = K_{ref} \cdot \Delta p$$

where the reference meter is identical to the Coriolis mass flow meter except for the reinforcing body which is omitted from the reference meter, where the following applies: $K_{ref}/K>2$, in particular $K_{ref}/K>3$.

In a further development of the invention, the Coriolis mass flow meter further comprises: at least one second oscillatory measuring tube for guiding a medium which is substantially structurally identical to the at least one first measuring tube and is guided parallel to said first measuring tube; at least one second reinforcing body which is fastened to a lateral surface of the at least one second measuring tube and surrounds the at least one second measuring tube, the at least one second reinforcing body having, at least in sections, a helical course with a plurality of windings, the distance between two adjacent windings of the at least one second reinforcing body being not less than twice, for example, not less than four times, and in particular not less than eight times the material thickness of the at least one second reinforcing body in the region of the windings, the material thickness of the at least one second reinforcing body in the region of the windings being equal to the material thickness of the at least one first reinforcing body in the region of the windings, the distance between the at least one first measuring tube and the at least one second measuring tube being greater than the simple material thickness of the first and second reinforcing bodies in the region of the windings, and the distance between the at least one first measuring tube and the at least one second measuring tube being less than twice the material thickness of the reinforcing bodies in the region of the windings.

BRIEF DESCRIPTION OF THE DRAWINGS

The invention is now explained in more detail on the basis of the exemplary embodiments shown in the figures. In the figures.

DETAILED DESCRIPTION

Figure 1:
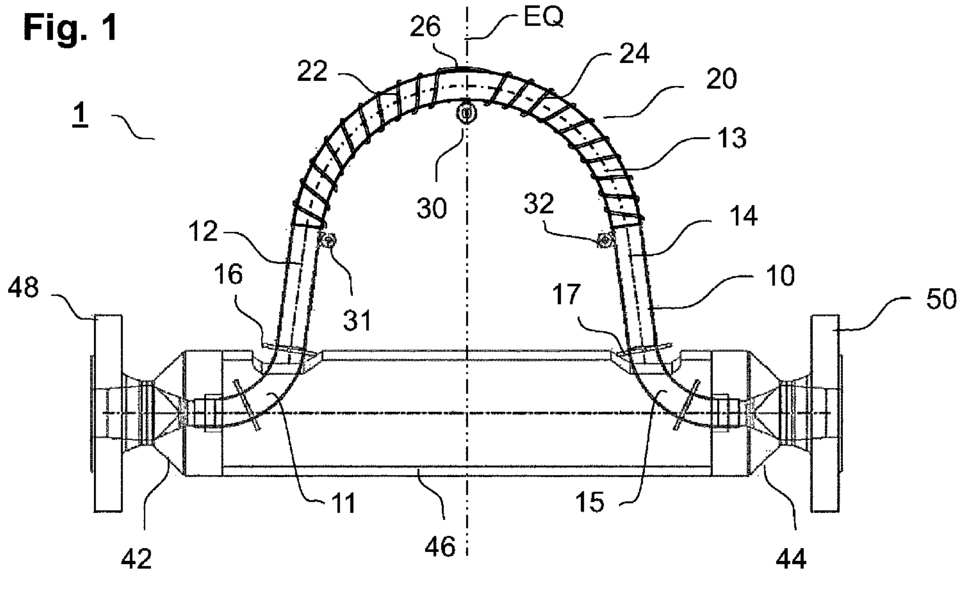
FIG. 1 shows a side, partially cross-sectional view of an exemplary embodiment of a Coriolis mass flow meter according to the present disclosure.

The exemplary embodiment of a Coriolis mass flow meter 1 according to the invention shown in FIG. 1 comprises two parallel measuring tubes 10 with an inner diameter of more than 15 mm and a wall thickness of 0.9 mm, which are made of stainless steel, for example, 1.4404 or Hastelloy. The nominal diameter of the Coriolis mass flow meter 1 is DN 25. The measuring tubes 10 run symmetrically with respect to a measuring tube transverse plane EQ, and each has an inlet bend 11, a first straight section 12, an apex bend 13, a second straight section 14 and an outlet bend 15. The measuring tubes 10 are connected to one another at least with a coupler 16 on the inlet side and a coupler 17 on the outlet side, a vibration length of the measuring tubes being determined by the couplers. The inlet bends 11 of the two measuring tubes 10 are connected to a flow divider 42 on the inlet side, which has a flange 48 on the inlet side for connection to a pipeline. The outlet bends 15 of the two measuring tubes 10 are connected to a flow divider 44 on the outlet side, which has a flange 50 on the inlet side for connection to the pipeline. The two flow dividers 42, 44 are rigidly connected to one another via a solid support tube 46 in order to largely suppress relative movements of the flow dividers to one another.

In order to excite measuring tube vibrations in a bending vibration mode, the Coriolis mass flow meter 1 has an electrodynamic exciter arrangement 30 which acts between the measuring tubes 10 and is arranged symmetrically to the measuring tube transverse plane EQ. In order to detect the measuring tube vibrations, the Coriolis mass flow meter 1 has an electrodynamic vibration sensor 31 on the inlet side and an electrodynamic vibration sensor 32 on the outlet side, which are set up to detect the relative movements of the measuring tubes 10 to one another at the respective sensor position. A time difference or phase difference between the sensor signals of the two vibration sensors is proportional to the mass flow rate through the measuring tubes. Accordingly, the mass flow rate can be determined by multiplying a phase difference or time difference by a calibration factor calf which describes this proportionality.

The calibration factor calf depends on a modal bending resistance of the measuring tubes, which in turn is pressure-dependent. The calibration factor calf therefore has a cross-sensitivity to the media pressure. In order to reduce this cross-sensitivity of the calibration factor to the media pressure, a reinforcing body 20 in the form of a helical spring is in each case guided around the apex bends 13 of the measuring tubes 10 and fixed to the measuring tube by means of a hard solder, in particular a nickel-based solder such as BNi-2. A joint formed with the hard solder preferably extends over the entire length of the reinforcing body. The helical spring-like the measuring tube—is made of stainless steel, for example, 1.4310, 1.430. A duplex wire is suitable for a measuring tube made of Hastelloy, since a duplex wire can be better soldered to the Hastelloy and has a better thermal expansion coefficient. It must be ensured that the thermal expansion coefficient substantially corresponds to that of the material of the helical spring of the measuring tube but, in any case, does not deviate from it by more than 1 ppm/K. The helical spring has a material thickness of, for example, 2 mm. A Coriolis mass flow meter with measuring tubes reinforced in this way has a considerably lower cross-sensitivity of the calibration factor calf to the media pressure than a Coriolis mass flow meter with measuring tubes without reinforcing bodies. In the exemplary embodiment, the pressure dependence is reduced to less than one third of the value for a Coriolis mass flow meter with such measuring tubes without reinforcing bodies.

Figure 5:
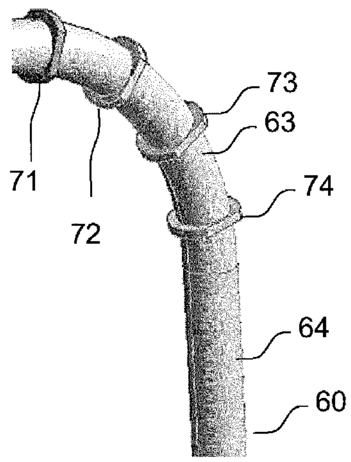
FIG. 5 shows a perspective detail view of a measuring tube with reinforcing bodies of a Coriolis mass flow meter according to the prior art.

The measuring tube 60 shown in FIG. 5 of a Coriolis mass flow meter with two measuring tubes according to the prior art differs from the exemplary embodiment from FIG. 1 with regard to the type of reinforcing bodies, which are designed here as separate rings 71, 72, 73, 74. The cross-sensitivity of the calibration factor calf to the media pressure is reduced in a comparable way to the Coriolis mass flow meter according to the invention, but the assembly of the reinforcing bodies according to the prior art is considerably more expensive, since the rings 71, 72, 73, 74 have to be precisely positioned individually and provided with solder material in order to avoid asymmetrical mass distributions. In contrast, the positioning, according to the invention, of the reinforcing body on the measuring tube of a Coriolis mass flow meter according to the invention is considerably simpler since the desired target position of the individual windings in the equilibrium state adjusts itself as a result of the elasticity of the helical spring. Furthermore, the use of the reinforcing bodies according to the present invention allows a smaller distance between the measuring tubes since the reinforcing function is distributed over more elements compared to the rings according to the prior art, with a winding being comparable to a ring.

Figure 2:
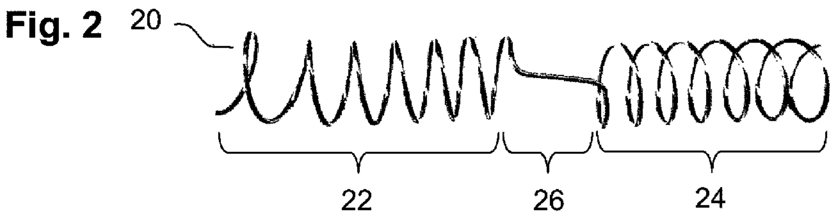
FIG. 2 shows an exemplary embodiment of a reinforcing body of a Coriolis mass flow meter according to the present disclosure.

Details of the reinforcing body are additionally shown in FIG. 2. The reinforcing body 20 comprises a metallic wire with a thickness of, for example, 1.5 mm with two helical spring sections 22, 24 with continuous sequences of windings, the helical spring sections 22, 24 being connected by a straight connection section 26, which in a first approximation runs parallel to the longitudinal axis of the helical sections but, in any case, does not deviate by more than 15° from the direction of the longitudinal axis of the helical sections. The inner diameter of the helical spring sections corresponds to the outer diameter of the apex bends 13 of the measuring tubes 10 in the equilibrium state. Thus, if the helical sections are slightly elastically twisted counter to their direction of rotation for assembly, in order to widen the inner diameter, they can be pushed almost without friction onto the measuring tubes and positioned. After relaxation of the elastic twist, the position of the reinforcing body on the measuring tube is fixed in a friction-locking manner. Here, a radial projection of the mass distribution of the reinforcing bodies 20 onto the center line of the corresponding measuring tube 10 is mirror-symmetrical to the measuring tube transverse plane EQ. The connection sections 26 each intersect the measuring tube transverse plane and thus bridge a winding-free region in which the exciter arrangement 30 is arranged, as shown in FIG. 1.

Figure 3:
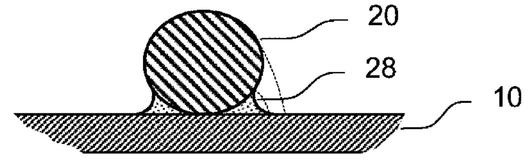
FIG. 3 shows a detail view of a longitudinal section through a measuring tube of an exemplary embodiment of a Coriolis mass flow meter according to the present disclosure.

For final fixing of the reinforcing bodies 20 on the measuring tubes 10, a hard solder material is applied along the reinforcing body 20, for example, as a solder paste. In a high-temperature (vacuum) soldering process, the solder material is melted and wets the interfaces between the reinforcing bodies 20 and the corresponding measuring tube 10, whereby joints 28 are formed between the reinforcing bodies 20 and the measuring tubes 10 when the solder material cools, as shown in FIG. 3.

Figure 4A:
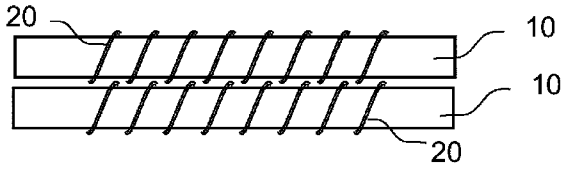
FIG. 4*a* shows a schematic plan view of a section of two parallel-guided measuring tubes of an exemplary embodiment of a Coriolis mass flow meter according to the present disclosure.

From the plan view in FIG. 4*a* of two parallel-guided measuring tubes 10 with reinforcing bodies 20, it can be seen that the windings of the reinforcing bodies have the same direction of rotation and in the space between the measuring tubes 10 at their widest point they each have a phase offset of half a winding relative to one another. This prevents the reinforcing bodies 20 from touching one another when the measuring tubes vibrate. The distance between the measuring tubes must therefore amount to at least only a material thickness of the reinforcing body. This aspect cannot be realized with the reinforcing rings according to the prior art, since these rings are mounted in the same position on adjacent measuring tubes. In order to still achieve a small measuring tube distance, the reinforcing bodies can have lateral flattened regions, as shown in FIG. 5, which, on the one hand, weakens the reinforcing bodies and, on the other hand, requires expensive production.

Figure 4B:
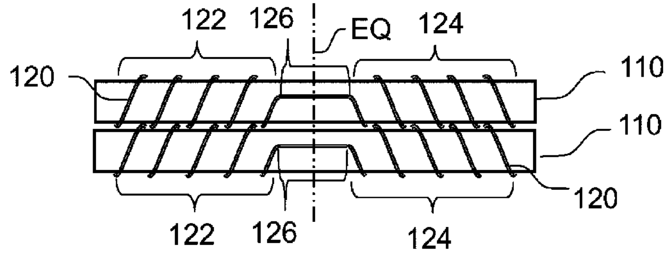
FIG. 4*b* shows a schematic plan view of a section of two parallel-guided measuring tubes of a further exemplary embodiment of a Coriolis mass flow meter according to the present disclosure.

FIG. 4*b* shows a further development of the invention with modified reinforcing bodies 120 in which, in contrast to the reinforcing bodies 20 in FIGS. 1 and 2, the direction of rotation of the helical spring sections 122, 124, which are each connected to one another by a connection section 126, is opposite. In this way, the mirror symmetry with respect to the measuring tube transverse plane EQ is maintained for the reinforcing bodies, which is not the case in the exemplary embodiment according to FIGS. 1 and 2. In this way, an already small influence of radial temperature gradients on the measuring tubes, for example, when changing between media of different temperatures, can be further reduced.

The invention claimed is:

1. A Coriolis mass flow meter, comprising:

an oscillatory first measuring tube configured to convey a medium;

at least one support body, which is connected to the first measuring tube on an inlet side and on an outlet side of the flow meter;

at least one exciter operable to excite at least one bending vibration mode of the first measuring tube;

at least two vibration sensors operable to detect vibrations of the first measuring tube; and a first reinforcing body, which is attached to a lateral surface of the first measuring tube and surrounds the first measuring tube, wherein the first reinforcing body, at least in sections, includes a helical course having a plurality of windings, wherein a distance between two adjacent windings of the plurality of windings is not less than twice a material thickness of the first reinforcing body in the corresponding section of the windings.

2. The Coriolis mass flow meter according to claim 1, wherein the distance between two adjacent windings of the plurality of windings is not less than eight times the material thickness of the first reinforcing body in the corresponding section of the windings.

3. The Coriolis mass flow meter according to claim 1, wherein the material thickness of the first reinforcing body is not less than half of a wall thickness of the first measuring tube.

4. The Coriolis mass flow meter according to claim 1, wherein the first measuring tube includes a first material, and the first reinforcing body includes a second material, and wherein a thermal expansion coefficient of the first material does not deviate from a thermal expansion coefficient of the second material by more than 2 ppm/K.

5. The Coriolis mass flow meter according to claim 4, wherein the thermal expansion coefficient of the first material does not deviate from the thermal expansion coefficient of the second material by more than 0.5 ppm/K.

6. The Coriolis mass flow meter according to claim 4, wherein the first material is metallic, and wherein the second material is metallic.

7. The Coriolis mass flow meter according to claim 1, wherein the first reinforcing body is connected to the first measuring tube via at least one joint, which comprises a hard solder connection.

8. The Coriolis mass flow meter according to claim 7, wherein the at least one joint extends over at least one winding of the first reinforcing body around the first measuring tube.

9. The Coriolis mass flow meter according to claim 7, wherein the at least one joint extends over at least three windings of the first reinforcing body around the first measuring tube.

10. The Coriolis mass flow meter according to claim 1, wherein the first reinforcing body includes at least one section which comprises at least three continuous windings of the plurality of windings.

11. The Coriolis mass flow meter according to claim 1, wherein the first reinforcing body includes at least one section which comprises at least eight continuous windings of the plurality of windings.

12. The Coriolis mass flow meter according to claim 1, wherein the first measuring tube has a mirror-symmetrical course with respect to a measuring tube transverse plane, and wherein the first measuring tube includes at least one section that, in a rest position of the first measuring tube, is bent between the first measuring tube transverse plane and an end of the first measuring tube on the inlet side, in which bent section a direction of a first measuring tube center line of the first measuring tube changes by an angle, which is not smaller than 30°, wherein the first reinforcing body in the bent section includes no fewer than windings than a quotient of the angle of the direction change divided by 20°.

13. The Coriolis mass flow meter according to claim 12, wherein the first reinforcing body in the bent section includes no fewer than windings than a quotient of the angle of the direction change divided by 10°.

14. The Coriolis mass flow meter according to claim 1, wherein:

the first measuring tube has a mirror-symmetrical course with respect to a measuring tube transverse plane;

the first measuring tube includes at least one section that, in a rest position of the first measuring tube, is bent between the first measuring tube transverse plane and an end of the first measuring tube on the inlet side, in which bent section a direction of a first measuring tube center line of the first measuring tube changes by an angle, which is not smaller than 30°;

the first measuring tube having an inner diameter, and the first measuring tube center line in the bent section having an effective radius of curvature, a ratio of four times the inner diameter to the effective radius of curvature is defined;

a product of the angle of the direction change and the ratio is defined; and the first reinforcing body in the bent section includes no fewer windings than a quotient of the product divided by 20°.

15. The Coriolis mass flow meter according to claim 1, wherein the first reinforcing body in the bent section includes no fewer windings than a quotient of the product divided by 10°.

16. The Coriolis mass flow meter according to claim 1, wherein the first reinforcing body includes:

a first section including windings of the plurality of windings which surround a first portion of the first measuring tube;

a second section including windings of the plurality of windings which surround a second portion of the first measuring tube; and a connection section which extends between the first section and the second section, wherein a length of the connection section is not more than twice a distance of the first section from the second section along a first measuring tube center line.

17. The Coriolis mass flow meter according to claim 7, wherein the hard solder connection comprises a nickel-based solder.

18. The Coriolis mass flow meter according to claim 1, wherein:

a calibration factor (calf) is determinable for the meter, which calibration factor describes a proportional relationship between a mass flow rate (dm/dt) of the medium to be measured and a phase difference or time difference between signals of the at least two vibration sensors;

the calibration factor has a relative cross-sensitivity (Δcalf (Δp)) to a difference (Δp) between a pressure in the first measuring tube (p) and a pressure in a region surrounding the first measuring tube (p0), which is defined as:

$$\Delta calf(\Delta p) := (\mathrm{calf}(p) - \mathrm{calf}(p0))/\mathrm{calf}(p0);$$

and an absolute value of relative cross-sensitivity (|Δcalf(Δp)|) at a temperature equilibrium between the medium, the first measuring tube, and a region surrounding the flow meter at a temperature of 300 K applies in a linear approximation:

$$|\Delta calf(\Delta p)| < S \cdot d_i/t \cdot \Delta p,$$

wherein $d_i$ is an inner diameter of the first measuring tube, t is a wall thickness of the first measuring tube, and S is an upper proportionality limit is less than 6 ppm/bar.

19. The Coriolis mass flow meter according to claim 18, wherein the upper proportionality limit is less than 4 ppm/bar.

20. The Coriolis mass flow meter according to claim 1, wherein:

a calibration factor (calf) is determinable for the meter, which calibration factor describes a proportional relationship between a mass flow rate (dm/dt) of the medium to be measured and a phase difference or time difference between signals of the at least two vibration sensors, wherein the calibration factor has a relative cross-sensitivity (Δcalf(Δp)) to a difference (Δp) between a pressure (p) in the first measuring tube and a pressure (p0) in a region surrounding the first measuring tube, which is defined as:

$$\Delta calf(\Delta p) := (\mathrm{calf}(p) - \mathrm{calf}(p0))/\mathrm{calf}(p0);$$

an absolute value of relative cross-sensitivity (|Δcalf(Δp)|) at a temperature equilibrium between the medium, the first measuring tube, and a region surrounding the flow meter at a temperature of 300 K applies in a linear approximation:

$$|\Delta calf(\Delta p)| = K \cdot \Delta p$$

wherein K is a device-specific constant; and the following applies to the absolute value of the relative cross-sensitivity of a reference meter in a linear approximation:

$$|\Delta calf_{ref}(\Delta p)| = K_{ref} \cdot \Delta p$$

wherein the reference meter is substantially identical to the flow meter except for the first reinforcing body, which is omitted from the reference meter, wherein $K_{ref}/K > 2$.

21. The Coriolis mass flow meter according to claim 1, further comprising:

at least one oscillatory second measuring tube configured to convey a medium, which at least one second measuring tube is substantially structurally identical to the first measuring tube and extends parallel to the first measuring tube;

at least one second reinforcing body, which is attached to a lateral surface of the at least one second measuring tube and surrounds the at least one second measuring tube, wherein:

the at least one second reinforcing body includes, at least in sections, a helical course with a plurality of windings;

a winding distance between two adjacent windings of the plurality of windings of the at least one second reinforcing body is not less than twice a material thickness of the at least one second reinforcing body in the corresponding section of the windings;

the material thickness of the at least one second reinforcing body in the corresponding section of the windings is equal to the material thickness of the first reinforcing body in the corresponding section of the windings;

a tube distance between the first measuring tube and the at least one second measuring tube is greater than a simple material thickness of the first reinforcing body and the at least one second reinforcing body in a region of the windings; and the tube distance between the first measuring tube and the at least one second measuring tube is less than twice the material thickness of the first reinforcing body and the at least one second reinforcing body in the region of the windings.

22. The Coriolis mass flow meter according to claim 21, wherein the winding distance between two adjacent windings of the plurality of windings is less than eight times the material thickness of the at least one second reinforcing body in the corresponding section of the windings.

* * * * *